United States Patent
Begen et al.

(10) Patent No.: US 8,655,156 B2
(45) Date of Patent: *Feb. 18, 2014

(54) AUXILIARY AUDIO TRANSMISSION FOR PRESERVING SYNCHRONIZED PLAYOUT WITH PACED-DOWN VIDEO

(75) Inventors: Ali C. Begen, London (CA); Tankut Akgul, Uskudar-Istanbul (TR); Michael A. Ramalho, Sarasota, FL (US); David R. Oran, Acton, MA (US); William C. Ver Steeg, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 696 days.

This patent is subject to a terminal disclaimer.

(21) Appl. No.: 12/715,481

(22) Filed: Mar. 2, 2010

(65) Prior Publication Data
US 2011/0217025 A1    Sep. 8, 2011

(51) Int. Cl.
| H04N 5/92 | (2006.01) |
| H04N 5/932 | (2006.01) |
| H04N 7/173 | (2011.01) |
| G06F 15/16 | (2006.01) |
| G10L 11/06 | (2006.01) |
| G10L 13/06 | (2006.01) |
| G10L 19/00 | (2006.01) |
| G10L 21/04 | (2006.01) |

(52) U.S. Cl.
USPC ........... 386/338; 386/207; 704/213; 704/214; 704/267; 704/503; 709/231; 725/100

(58) Field of Classification Search
USPC ............... 386/338, 207, E5.001; 348/E5.112, 348/E7.061, E7.024; 704/503, 213, 214, 704/267; 709/231; 725/100; G9B/27.01
See application file for complete search history.

(56) References Cited

U.S. PATENT DOCUMENTS

| 4,913,539 A | 4/1990 | Lewis |
| 5,689,618 A | 11/1997 | Gasper |
| 5,842,172 A * | 11/1998 | Wilson .......................... 704/503 |
| 5,953,049 A | 9/1999 | Horn |

(Continued)

FOREIGN PATENT DOCUMENTS

| EP | 1 432 250 A1 | 6/2004 |
| WO | WO 03/094518 A1 | 11/2003 |

OTHER PUBLICATIONS

International Search Report and Written Opinion dated Sep. 3, 2009 cited in Application No. PCT/US2008/085613.

(Continued)

*Primary Examiner* — Thai Tran
*Assistant Examiner* — Syed Hasan
(74) *Attorney, Agent, or Firm* — Merchant & Gould P.C.

(57) ABSTRACT

In one method embodiment, providing a multiplex of compressed versions of a first video stream and a first audio stream, each corresponding to an audiovisual (A/V) program, the first video stream and the first audio stream each corresponding to a first playout rate and un-synchronized with each other for an initial playout portion; and providing a compressed version of a second audio stream, the second audio stream corresponding to a pitch-preserving, second playout rate different than the first playout rate, the second audio stream synchronized to the initial playout portion of the first video stream when the first video stream is played out at the second playout rate, the first audio stream replaceable by the second audio stream for the initial playout portion.

20 Claims, 9 Drawing Sheets

(56) References Cited

U.S. PATENT DOCUMENTS

| | | | |
|---|---|---|---|
| 5,960,006 A | 9/1999 | Maturi et al. | |
| 7,145,606 B2 | 12/2006 | Haisma | |
| 7,170,545 B2 | 1/2007 | Rodman | |
| 7,297,856 B2 | 11/2007 | Sitrick | |
| 7,394,833 B2 | 7/2008 | Heikkinen | |
| 7,636,022 B2 | 12/2009 | Shenoi | |
| 2003/0208771 A1* | 11/2003 | Hensgen et al. | 725/100 |
| 2009/0148131 A1 | 6/2009 | Akgul | |
| 2011/0216785 A1 | 9/2011 | Begen et al. | |

OTHER PUBLICATIONS

E. Steinbach, "Adaptive Abspieltechniken für Internet-Mediastreaming," XP-001220605, vol. 57, No. 1/02, Jan. 2003, pp. 22-25 (English translation unavailable).

\* cited by examiner

AUXILIARY AUDIO TRANSMISSION FOR PRESERVING SYNCHRONIZED PLAYOUT WITH PACED-DOWN VIDEO

TECHNICAL FIELD

The present disclosure relates generally to audio and video (A/V) stream synchronization.

BACKGROUND

A growing number of consumers now have high speed, or broadband, connections to the Internet in their homes. The increased bandwidth provided by these broadband connections allows the delivery of digital television, video, and multimedia services to customer premises (e.g., home or business consumers). These services are transported over a network as audio and video (A/V) streams. At the customer premises, a digital receiver, set-top box, or computer, among other devices, decodes the A/V streams and generates a picture signal with associated sound for presentation by a television or monitor with audio-play functionality. A switch to a different A/V stream (e.g., via channel change, or other stream transition event) results in a finite amount of delay before the new A/V stream can be decoded and presented in synchronization.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
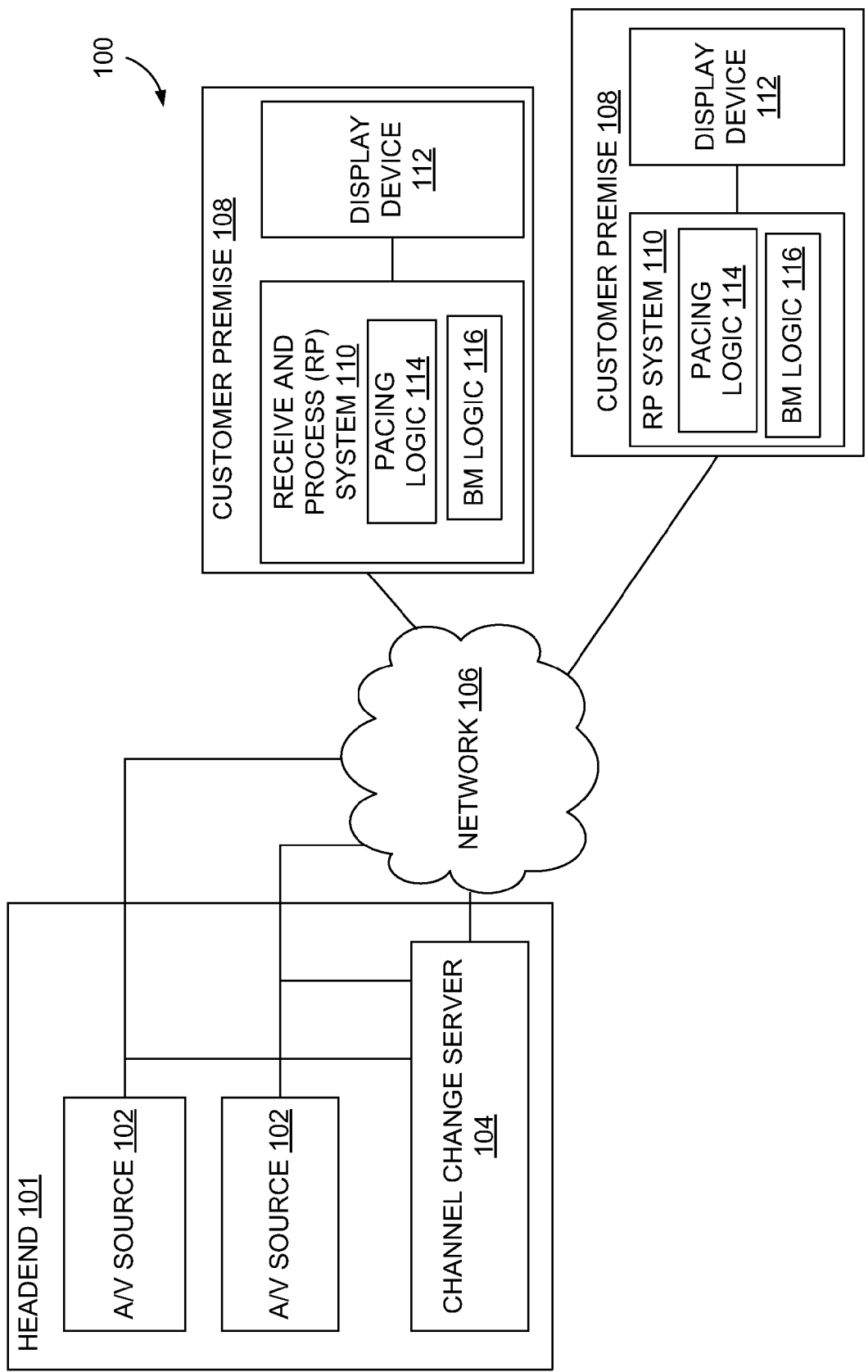
FIG. 1 is a block diagram that illustrates an example environment in which certain embodiments of audio-video-pacing (AVP) systems and methods can be implemented.

In one method embodiment, providing by a network device a multiplex of compressed versions of a first video stream and a first audio stream, each corresponding to an audiovisual (A/V) program, the first video stream and the first audio stream each corresponding to a first playout rate and unsynchronized with each other for an initial playout portion; and providing a compressed version of a second audio stream, the second audio stream corresponding to a pitch-preserving, second playout rate different than the first playout rate, the second audio stream synchronized to the initial playout portion of the first video stream when the first video stream is played out at the second playout rate, the first audio stream replaceable by the second audio stream for the initial playout portion.

Example Embodiments

Disclosed herein are various example embodiments of audio-video pacing (AVP) systems and methods (collectively, AVP system or AVP systems) in a communications environment, such as a subscriber television system, that provides for synchronous A/V presentation without delay responsive to a stream transition event (e.g., channel change, trick modes, etc.). Some embodiments of the AVP system provide for buffer expansion and/or contraction while maintaining the A/V presentation in a synchronous and uninterrupted fashion.

In one stream transition event embodiment, an A/V source (e.g., headend encoder) or a channel change server (each also referred to herein as an upstream network device) generates (or receives) a pitch-constant (pitch-preserving, pitch-preserved, or the like), paced-down (slowed-down) audio track, the pitch-preserving audio corresponding to a portion of an audiovisual program. The audiovisual program and pitch-preserving audio are processed and delivered to a receive-and-process (RP) system (also referred to herein as a downstream network device), such as a set-top terminal, computer, etc., in response to, for instance, a channel change event requested by the RP system. The pitch-preserving audio may be sent in a multiplex of compressed video and audio streams (e.g., the multiplex, or transport stream, comprising a single program or multiple program transport stream), or in some embodiments, in association with a stream that is separate from the multiplex stream (e.g., delivered via a unicast transmission). The RP system receives the pitch-preserving audio track contemporaneously with the video stream of the multiplex, and decoding logic of the RP system slows down the video decoding clock rate to a decoding rate that equals the decoding rate of the pitch-preserving audio track. The RP system decodes the video and pitch-preserving audio, and plays out the decoded video stream in synchronization (e.g., lip-synched) with the decoded, pitch-preserving audio track, circumventing the audio-video presentation delay typically associated with audio-video transmissions while preserving the sound quality as perceived by a user in uninterrupted fashion. Presentation of the real-time audio associated with the multiplex is delayed at least until the real-time audio "catches up" (e.g., timestamp values match) to the video.

In one buffer expansion embodiment, an upstream network device provides one or more selectable, pitch-preserving audio tracks for playout with video of, for instance, a multiplex of real-time video and audio. The playout of the appropriate pitch preserving audio is synchronized with the video, the video played-out at a decoding rate that is slower than the real-time video of the multiplex. The one or more pitch-preserving audio tracks may be delivered (e.g., via the multiplex or as a separate unicast or multicast stream) in response to a request by an RP system. In one embodiment, the RP system comprises logic to determine the need for buffer expansion (e.g., to satisfy forward error correction (FEC) block or retransmission buffer re-sizing requirements). The substitution or replacement for decoding and presentation of real-time audio of the received multiplex with the pitch-preserving audio tracks results in an increase (e.g., incremental) in buffer size without disturbing, or at least mitigating the disturbance, of a user's viewing experience. Responsive to obtaining a suitable or targeted buffering level, decoding logic of the RP system plays-out the video at the real-time decoding rate in synchronization with real-time audio.

These and other embodiments and/or other features are described hereinafter in the context of an example subscriber television system environment, with the understanding that other multimedia (e.g., video, graphics, audio, and/or data, collectively or individually also referred to herein as media content) environments may also benefit from certain embodiments of the AVP systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a block diagram of an example environment, a subscriber television system or network 100, in which certain embodiments of AVP systems and/or methods may be implemented. It should be understood by one having ordinary skill in the art, in the context of the present disclosure, that the subscriber television network 100 shown in FIG. 1 is merely illustrative, and should not be construed as implying any limitations upon the scope of the disclosure. The subscriber television network 100 includes a headend 101 comprising one or more audio-video (A/V) sources 102 and one or more channel change servers 104 (one shown) communicatively coupled to one or more customer premises 108 over a communications network 106. The A/V sources 102 deliver various digital services (e.g., borne from local feeds or storage, and/or sourced via a provider network upstream of the headend 101 and processed at the headend 101) to subscribers, which may include broadcast television programming, video-on-demand (VoD), pay-per-view, music, Internet access, e-commerce (e.g., online shopping), voice-over-IP (VoIP), and/or other telephone or data services. In one embodiment, the A/V sources 102 comprise pitch-preserving audio logic (explained further below) configured to generate pitch-preserving audio tracks for portions of A/V programming. In some embodiments, pitch-preserving audio tracks are delivered from one or more sources upstream of the A/V sources 102, or generated elsewhere in the network 100. The A/V sources 102 comprise, in some embodiments, codec and encryption/decryption functionality (explained further below), and are configured to deliver encoded (e.g., according to one or more of a plurality of different transport and video and/or audio coding standards/specifications, such as AVC, MPEG-2, MP3, etc.) video, audio, data, and/or graphics content for a single program carried in a single program transport stream (e.g., MPEG-2, which includes one or more packetized elementary stream (PES) packet streams sharing a common time base), and in other implementations, the encoded visual content for multiple programs may be carried as multiple MPEG-2 programs (multiple program transport stream), each MPEG-2 program associated with its own respective time base. Accordingly, the multiplex of media content for a given program or programs may be transported as a transport stream, the transport stream delivered with or without further encapsulation (e.g., Real-time Transport Protocol (RTP)/User Datagram Protocol (UDP)/Internet protocol (IP), UDP/IP, etc.). As shown, the channel change server 104 receives encoded streams from the A/V sources 102 and buffers the same for a defined period of time (e.g., last defined portion of programming for each channel) to provide error recovery (e.g., retransmission) and/or accelerated channel change capabilities.

It should be understood that, although MPEG-2 based video encoding and transport is described throughout the disclosure, encoding and/or transport according to other video and/or audio specifications and/or standards (including proprietary mechanisms) may similarly benefit from the AVP systems described herein and hence are contemplated to be within the scope of the disclosure.

In one embodiment, shown in FIG. 1, the A/V sources 102 and channel change server 104 are co-located at the headend 101, though it should be understood by one having ordinary skill in the art that such co-location may be at other locations in the network 100 (e.g., hub, node, etc.). In one embodiment, the A/V sources 102 and channel change server 104 are coupled to one another via a local area network (e.g., an Ethernet network). In some embodiments, A/V sources 102 and channel change server 104 may be located in separate locations.

The customer premises 108 each comprise one or more receive-and-process (RP) systems 110 (one per premise shown) and one or more display devices, such as display device 112. The display device 112 is coupled to, or in some embodiments, integrated with, the RP system 110. In one implementation, the display device 112 is configured with an audio component (e.g., speakers), whereas in some implementations, audio functionality may be provided by a device that is separate from, yet communicatively coupled to, the display device 112 and/or RP system 110. The RP system 110 further includes pacing logic 114 and buffer management (BM) logic 116. The pacing logic 114, in cooperation with decoding logic of the RP system 110, includes functionality to effect substitution of real-time audio received in a multiplex with pitch-preserving audio tracks. The buffer management logic 116, in cooperation with the pacing logic 114, facilitates buffer management by effecting buffer contraction and/or expansion based on user or resident application requirements. Both of these modules are described further below. The RP system 110 (also referred to herein as a digital receiver or processing device) may comprise one of many devices or a combination of devices, such as a set-top box, television with communication capabilities, mobile devices such as cellular phone, personal digital assistant (PDA), or other computer or computer-based device or system, such as a laptop, personal computer, DVD and/or CD recorder, among others.

The communications network 106 comprises a bi-directional network, or, in some embodiments, a one-way network, and may include a cable television network, a satellite television network, a terrestrial network, an IP network, or a combination of two or more of these networks or other networks. Further, network PVR and switched digital video are also considered within the scope of the disclosure. Generally, the communications network 106 may comprise a single network, or a combination of networks (e.g., local and/or wide area networks). For instance, the communications network 106 may comprise a wired connection or a wireless connection (e.g., satellite, wireless local area network (LAN), etc.), or a combination of both. In the case of wired implementations, communications network 106 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

It should be understood by one having ordinary skill in the art, in the context of the present disclosure, that the subscriber television network 100 may comprise additional equipment and/or facilities, such as one or more other servers, routers, and/or switches at one or more locations of the network 100 that process, deliver, and/or forward (e.g., route) various digital (and analog) services to subscribers. In some embodiments, the subscriber television network 100 (or components thereof) may further comprise additional components or facilities, such as QAM and/or QPSK modulators, routers, bridges, Internet Service Provider (ISP) facility servers, private servers, on-demand servers, multimedia messaging servers, program guide servers, gateways, multiplexers, and/or transmitters, among other equipment, components, and/or devices well-known to those having ordinary skill in the art.

In one embodiment, the components of an AVP system comprise the A/V source 102, channel change server 104, or the RP system 110, individually (or select components thereof), or in some embodiments, as a collection of two or more of these components and/or others shown (or not shown) in FIG. 1.

Figure 2:
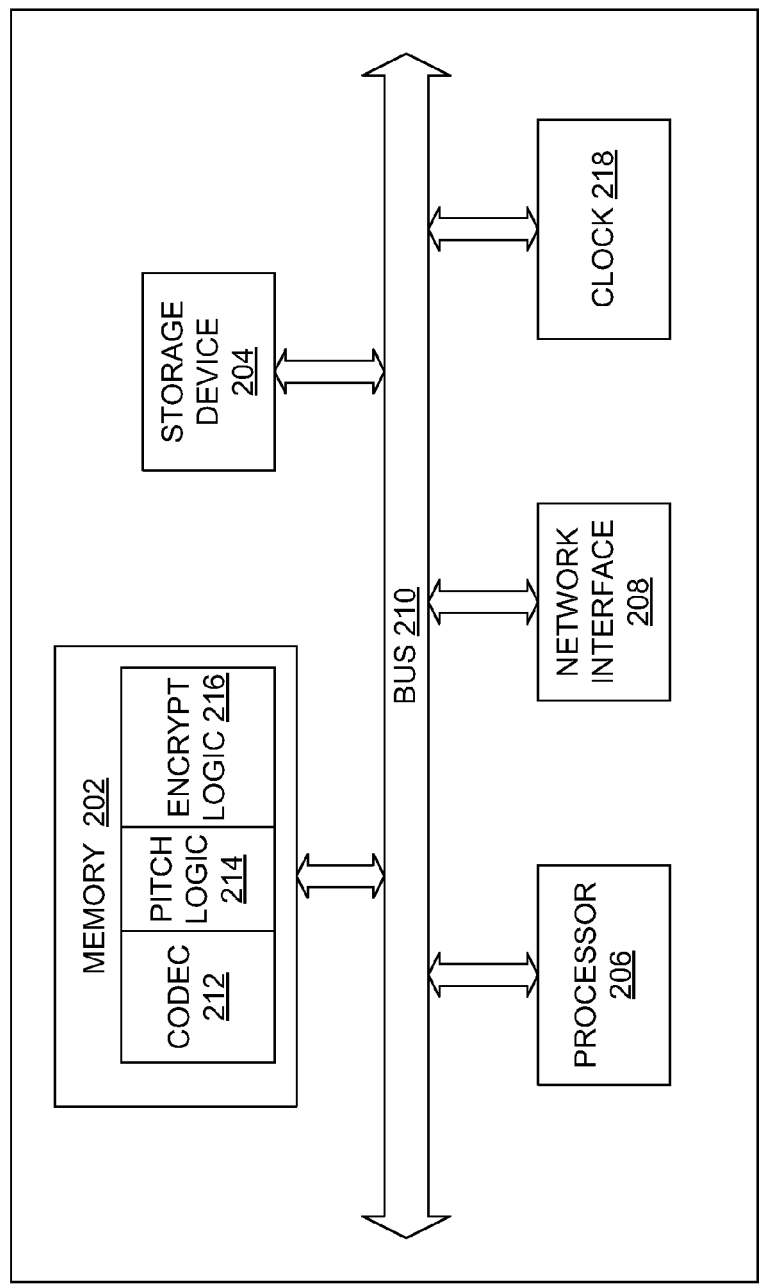
FIG. 2 is a block diagram that illustrates an embodiment of an example audio-video (A/V) source of an example AVP system.

FIG. 2 is a block diagram that illustrates an embodiment of an example A/V source 102, though the same or similar components may also be found in certain embodiments of the channel change server 104. It should be understood by one having ordinary skill in the art, in the context of the present disclosure, that the A/V source 102 shown in FIG. 2 is merely illustrative, and should not be construed as implying any limitations upon the scope of the disclosure. The A/V source 102 comprises a memory 202 that comprises a tangible medium such as volatile memory (e.g., random access memory (RAM)) and/or non-volatile memory (e.g., read-only memory (ROM)), the memory 202 encoded with various instructions or executable code. The A/V source 102 further comprises an optional storage device 204 (e.g., CD, DVD, etc.), a processor 206 (e.g., microcontroller, microprocessor, digital signal processor, etc.), and a network interface 208 configured to enable the reception of uncompressed or compressed A/V streams (or other media content streams) from a network provider or other devices, and further configured to provide processed (e.g., encrypted, encoded, etc.) A/V streams to other components (e.g., channel change server 104) or devices in the network 100. The memory 202, storage device 204, processor 206, and network interface 208 are coupled over a bus 210.

In one embodiment, the memory 202 comprises codec logic (codec) 212, pitch logic 214, and encryption (encrypt) logic 216. Though shown as software, it should be understood that functionality of one or more of the codec logic 212, pitch logic 214, and encryption logic 216 may be implemented in some embodiments in hardware, or a combination of hardware and software. The encryption logic 216 may further comprise decryption logic (not shown) in some embodiments. The codec logic 212 is configured to receive and process uncompressed A/V streams associated with an A/V program. In some embodiments, the codec 212 includes transcoding functionality.

The pitch logic 214, in cooperation with the codec logic 212, is configured to generate audio tracks (e.g., of predetermined, discrete interval or segment lengths) based on the decoded A/V streams, the audio tracks generated at one or more selectable (or fixed in some embodiments) decoding rates that are incrementally slower, or faster, than the intended presentation rate (e.g., original or real-time playout rate, referred to herein also as the 1× rate). For instance, one track may be a pitch-preserving, paced-down (e.g., at 80% of the original rate, or 0.8×) audio track, another track for the same playout portion at 0.9×, etc. In some implementations, paced-up (sped-up), pitch-preserving audio tracks may be generated (e.g., 1.1×). The factor of playout rate relative to the original playout rate is based on one or more factors, such as the targeted amount of buffer expansion/contraction, effect on viewer experience, among other factors. In some embodiments, the audio tracks are provided upstream of the A/V source 102.

The pitch logic 214, in cooperation with the codec logic 212, is configured to determine locations (e.g., associated with random access points or RAPs) in decoded A/V streams where substitution of real-time audio segments or intervals with the pitch-preserving audio tracks will go un-noticed or relatively un-noticed by a viewer. In one embodiment, locations in a given A/V presentation are selected for substitution based on what is occurring, in a programming presentation, in the audio domain (e.g., the nature of the audio, such as whether it is rhythmic, silent, etc., whether the audio is concert quality music or hard rock, noise, etc.) and/or video domain (e.g., still scene, presence of significant motion, etc.) at that location(s), and whether substitution at the given location(s) results in a good choice, or at least, an acceptable choice. In one embodiment, the pitch logic 214 is configured to generate optional auxiliary data that, when delivered over the communications network 106, assists downstream network devices in determining which packets (e.g., via packet identifiers) of 1× audio to replace with pitch-preserving audio (e.g., 0.8× audio).

Explaining further, headend equipment generally delays audio with respect to video, which results in a time offset between real-time audio and video streams at the time the real-time streams are received by the RP system 110. The pitch logic 214 is configured to produce pitch-preserving audio streams from the original audio stream (e.g., in real-time), and thus the time offset (and any further processing delay) is a remnant from processing of the original streams that should be addressed to achieve A/V synchronized playout at the RP system 110. In one embodiment, the pitch logic 214 (or an extension thereof) compensates for any time offset by delaying (e.g., via buffering mechanisms) the video stream with respect to the pitch-preserving audio stream to enable a synchronous (or near synchronous) output of the video stream and corresponding pitch-preserving audio stream. In some embodiments, such a compensating delay between a video stream and corresponding pitch-preserving audio stream may be imposed at other components (hardware and/or software) or devices, such as a multiplexer (not shown) or at the channel change server 104. In the latter implementation of the channel change server 104 (which is configured to buffer video and audio streams for unicast bursts), the channel change server 104 may choose an appropriate starting point for the pitch-preserving audio streams based on the starting point of the unicast burst. In some embodiments, other mechanisms may be employed to impose such compensating delays.

Note that optional forward error correction (FEC) coding may also be implemented at the A/V source 102 or channel change server 104 according to known manner.

The codec logic 212 codes the audio track (and corresponding video) according to a given coding specification and/or standard (e.g., MPEG-2, AVC, etc.), and the encryption logic 216 encrypts the coded content. The coded and encrypted video and audio (and other data) streams may undergo further processing in known manner, such as multiplexing as a single program or multiple program transport stream, optional encapsulation (e.g., RTP/UDP/IP, UDP/IP, etc.), modulation (e.g., QAM modulation), among other processes as is applicable for the given system environment, and delivery to customer premises 108.

In one embodiment, the processed (e.g., coded and encrypted), pitch-preserving audio is delivered over the communications network 106 multiplexed in the original MPEG-2 transport stream (the original MPEG-2 transport stream delivered over the network 106 with or without further encapsulation). Processing on the downstream network device side is described below in association with the RP system 110.

In some embodiments, the pitch-preserving audio is delivered to the channel change server 104, from which the pitch-preserving audio is delivered to the customer premises 108. For instance, the channel change server 104 receives from the A/V source 102 the processed, pitch-preserving audio multiplexed in the original MPEG-2 transport stream. As another example embodiment, the channel change server 104 receives the processed, pitch-preserving audio multiplexed in an MPEG-2 transport stream encapsulated in a separate RTP stream, with appropriate management of the program clock reference (PCR)/presentation timestamp (PTS) information among the original transport stream and the separate RTP stream. In either case, the pitch-preserved audio is delivered from the channel change server 104 via an RTP session responsive to a stream transition event or as requested by the RP system 110, with appropriate timing established at the channel change server 104 between the transport stream and the RTP stream. In some embodiments, a digital control manager may be an intervening component that uses SSRC multiplexing with the original RTP stream. In embodiments where transport-level synchronization is unavailable or otherwise unsuited for the application, RTP-level synchronization may be employed in known manner.

In certain embodiments using the channel change server 104 for delivery of the pitch-preserving audio, delivery may be implemented via a unicast retransmission session with payload-type multiplexing. Additionally, note that in buffer management implementations, the channel change server 104 may provide the segmented pitch-preserving audio on a separate multicast session, whereby the RP systems 110 join and extract as needed and leave the multicast session when convenient.

As indicated above, one or more of the functionality shown in, or described in association with, the A/V source 102 of FIG. 2 may also reside in the channel change server 104, thus enabling generation of the pitch-preserving audio at the channel change server 104. In such embodiments, the channel change server 104 may receive decryption keys from the A/V source 102, and parse, extract, decrypt, and decode the transport stream comprising the coded and encrypted 1× video and audio (and other data) received from the A/V source 102 (or from other sources). In some embodiments, the channel change server 104 retains as much audio in a buffer as is stored of the transport stream as a whole to enable a time-window into the encrypted audio.

Pitch logic 214 in cooperation with the codec logic 212, both residing in the channel change server 104, employ a proactive approach, an on-demand approach, or a combination of both approaches in the generation of the pitch-preserving audio. In the proactive approach, the pitch logic 214, in cooperation with the codec logic 212, operates similarly as described above as occurring at the A/V source 102, which essentially amounts to picking an appropriate RAP (e.g., without "prompting" or demand), generating the pitch-preserving audio track based on conditions in the audio and/or video domain for the particular location of the audiovisual programming selected, and retaining the pitch-preserving audio stream for implementation responsive to a stream transition event or RP system request.

In the on-demand approach, the channel change server 104 awaits a request from the RP system 110, and responsive to the request, selects an appropriate RAP from which to provide a burst stream, generates the pitch-preserving audio, and provides the pitch-preserving audio as an alternative elementary stream to the RP system 110. The request may be based on one of several mechanisms, with or without modification, such as a rapid channel change (RAMS), a retransmission (NACK), codec control message (e.g., as in RFC 5104), among other forms of feedback or messages. The RP system 110 inserts the pitch-preserving audio in an audio decode buffer in place of the 1× audio. In some embodiments, the channel change server 104 processes pitch-preserving audio in an on-going manner (e.g., over a few groups of pictures (GoPs) or other defined intervals), terminating the extract and pitch-preserving audio generation in one embodiment responsive to a timeout without any further requests. This terminable, on-going process over the defined interval enables picking up of an impulse of channel changes for a given channel, while avoiding overloading the channel change server 104 with continuous audio processing.

One or more of the above-mentioned software logic (e.g., 212, 214, and/or 216) may be combined with each other as a single module in some embodiments, or distributed among different devices in some embodiments. The upstream network device software logic (e.g., 212, 214, and/or 216) comprise instructions that, when executed by the processor 206, cause the processor 206 to perform the various functions associated with the A/V source 102 and/or channel change server 104. In some embodiments, functionality of one or more of the upstream network device software logic (e.g., 212, 214, and/or 216) may be implemented at least in part via fixed or programmable logic, such as an integrated circuit or field programmable gate array (FPGA), among others.

Figure 3:
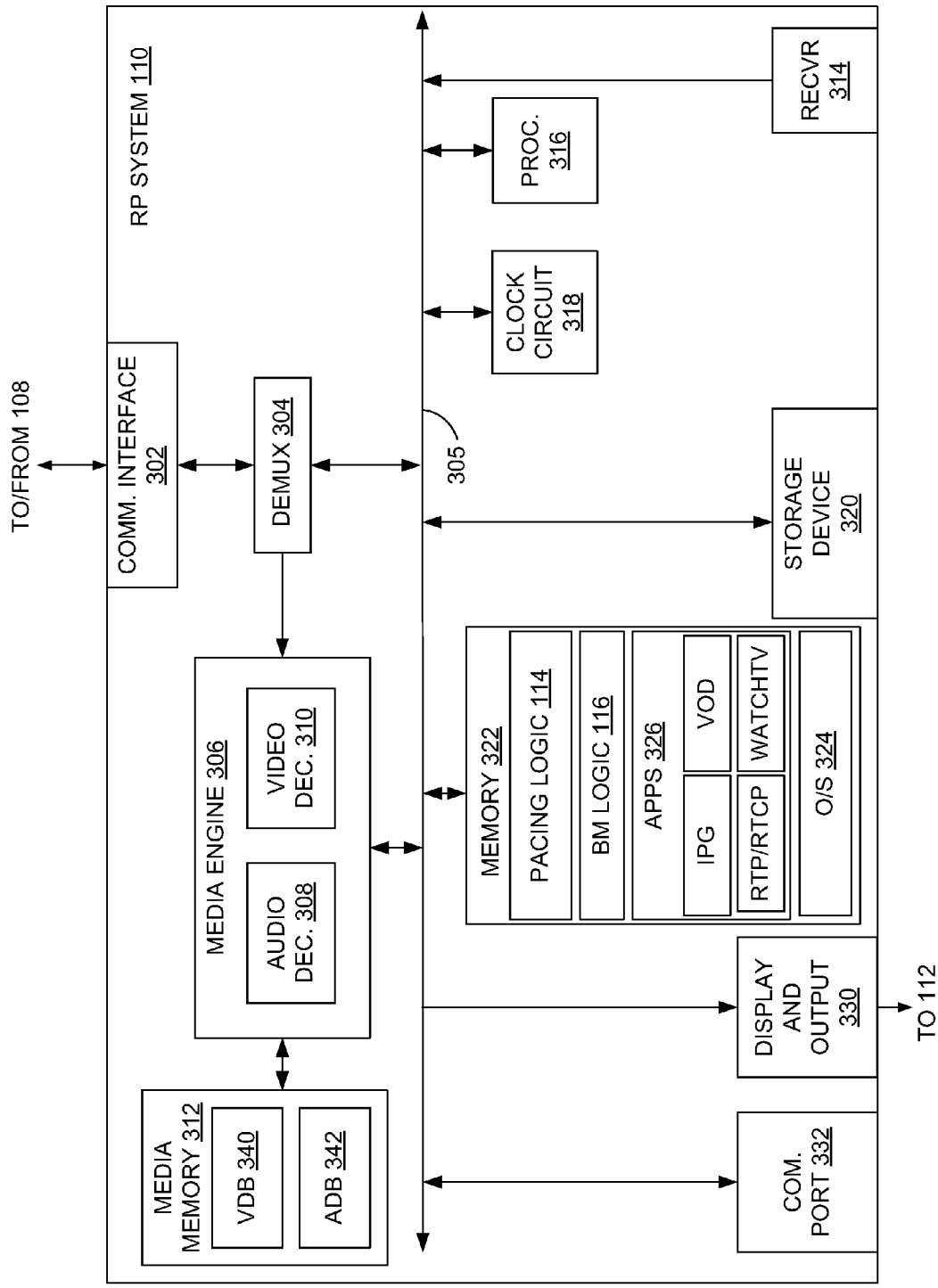
FIG. 3 is a block diagram that illustrates an embodiment of an example receive-and-process (RP) system of an example AVP system.

FIG. 3 is a block diagram that illustrates an embodiment of an example RP system 110. It should be understood by one having ordinary skill in the art, in the context of the present disclosure, that the RP system 110 shown in FIG. 3 is merely illustrative, and should not be construed as implying any limitations upon the scope of the disclosure. The RP system 110 includes a communication interface 302 (e.g., depending on the implementation, suitable for enabling communication functionality for in-band and/or out-of-band transport streams or encapsulated transport streams (herein, in-band transport stream also referred to as a multiplex). For instance, the communication interface 302 may be of a type suitable for communication over an IP network, a coaxial cable network, an HFC network, and/or wireless network, among others. The communication interface 302 is coupled to a demultiplexer (herein, also demux) 304. The demux 304 is configured to identify and extract information in the video and audio streams (e.g., transport stream) to facilitate the identification, extraction, and processing of the compressed pictures and associated audio. Such information may include Program Specific Information (PSI) (e.g., Program Map Table (PMT), Program Association Table (PAT), etc.) and parameters or syntactic elements (e.g., Program Clock Reference (PCR), timestamp information, payload_unit_start_indicator, etc.) of the transport stream (including packetized elementary stream (PES) packet information). Such information is forwarded to or otherwise received by the pacing logic 114 and bandwidth management logic 116 and/or media engine 306 as explained further below. In one embodiment, the demux 304 is configured with programmable hardware (e.g., PES packet filters). In some embodiments, the demux 304 is configured in software, or a combination of hardware and software.

Although the RP system 110 is described in the context of an IPTV implementation, it should be appreciated by one having ordinary skill in the art that the RP system 110 may comprise additional and/or different components in some embodiments. For instance, some embodiments of the RP system 110 may include a tuner system (e.g., radio frequency tuning, not shown) coupled to the communication interface 302, the tuner system comprising one or more tuners for receiving the transport streams received via the communication interface 302. Further, in some embodiments, a demodulator may be employed, such as to demodulate the received carrier signal, wherein the demux 304 is configured to parse the transport stream packets of one or more defined carrier frequencies.

The demux 304 is coupled to a bus 305 and to a media engine 306 (also known as an audio/video (a/v) processing or decoding device). The media engine 306 comprises, in one embodiment, decoding logic comprising one or more of a respective audio decoder 308 and video decoder 310. The decoding logic is further configured by the pacing logic 114 to substitute 1× audio with pitch-preserving audio and vice versa. The decoding logic is further configured by the buffer management logic 116 to determine a need for buffer expansion or contraction, and generate feedback requests (e.g., RTP Control Protocol, or RTCP, among others) to an upstream network device for pitch-preserving audio. Though shown as a software module in memory 322, the pacing logic 114 and/or buffer management logic 116 may reside elsewhere in RP system 110, alone or integral to other components, such as the media engine 306 or elsewhere in the RP system 110, and hence may also be referred to herein as part of the decoding logic in some embodiments. The media engine 306 is further coupled to the bus 305 and to media memory 312, which in one embodiment comprises one or more buffers for temporarily storing compressed and/or reconstructed pictures, such as video decoder buffer (VDB) 340 and audio decoder buffer (ADB) 342. In some embodiments, the buffers 340, 342 of the media memory 312 may reside in other memory (e.g., memory 322, explained below).

The RP system 110 comprises additional components coupled to bus 305. For instance, the RP system 110 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the RP system 110, and a clock circuit 318 comprising phase and/or frequency locked-loop circuitry to lock into system clock information (e.g., program clock reference, or PCR, which may be used to reconstruct the system time clock (STC) at the RP system 110) received in an audio, video, or A/V stream (e.g., adaptation field of the transport stream, RTP header, etc.) to facilitate decoding operations and to clock the output of reconstructed audiovisual content. For instance, PTS/DTS values received in a transport stream (or RTP stream header in some embodiments) are compared to the reconstructed STC (generated by the clock circuit 318) to enable a determination of when the buffered compressed pictures are provided to the video decoder 310 for decoding (DTS), when the buffered, decoded pictures are output by the video decoder 310 (PTS) to display and output logic 330 for processing and subsequent presentation on a display device 112, and which PIDs to extract for the appropriate audio (e.g., pitch-preserving audio, etc.). In some embodiments, clock circuit 318 may comprise plural (e.g., independent or dependent) circuits for respective video and audio decoding operations. Although described in the context of hardware circuitry, some embodiments of the clock circuit 318 may be configured as software (e.g., virtual clocks) or a combination of hardware and software. Further, in some embodiments, the clock circuit 318 is programmable.

The RP system 110 further comprises, in one embodiment, a storage device 320 (and associated control logic) to temporarily store buffered content and/or to more permanently store recorded content. Memory 322 in the RP system 110 comprises volatile and/or non-volatile memory, and is configured to store executable instructions or code associated with an operating system (O/S) 324, and one or more applications 326 (e.g., interactive programming guide (IPG), video-on-demand (VoD), WatchTV (associated with broadcast network TV), RTP/RTCP, among other applications such as pay-per-view, music, personal video recording (PVR), driver software, etc.).

Further included in one embodiment of memory 322 is pacing logic 114 and buffer management logic 116, referred to previously, and which in one embodiment is configured in software. In some embodiments, the pacing logic 114 and buffer management logic 116 may be configured in hardware, or a combination of hardware and software. The pacing logic 116, which operates in conjunction with the decoding logic of the media engine 306 and the demux 304, is responsible for interpreting auxiliary data that facilitates the decision of which pitch-preserving audio packets to use for substitution and which 1× audio packets to replace with the pitch-preserving audio packets, managing the substitution between pitch-preserving audio and 1× audio when auxiliary data is not present, and directing the pacing-up or pacing-down of the video decoder clocking rate (e.g., via cooperation with the clock circuit 318) to enable sped-up or slowed-down video decoding, respectively.

In one embodiment, the pacing logic 114, in cooperation with the decoding logic and demux 304, remaps the PIDs of the 1× audio to another PID value, and ascribes the PIDs previously identifying the 1× audio to the pitch-preserving audio for use by decoding logic. In some embodiments, auxiliary data sent in the transport stream or a separate stream directs the decoding logic (with or without pacing logic intervention) to decode PID values associated with the pitch-preserving audio in place of the PIDs associated with the 1× audio. In some embodiments, selection of the appropriate audio track (selected from among plural track rates, including real-time audio) is implemented without signaling or PID remapping, where the pitch-preserving audio is selected based on comparing (e.g., by the decoding logic or pacing logic 114 in cooperation with the decoding logic) the adjusted video decoding rate with a matching rate from one of the corresponding audio tracks.

The buffer management logic 116 tracks buffer capacity requirements in the context of application resources and application demands, and alone or in cooperation with RTP/RTCP application software in the RP system 110, effects the generation of requests to upstream network devices for pitch-preserving audio when desired or needed for buffer expansion or contraction, and further coordinates with the pacing logic 114 to facilitate video decoding rate adjustment for pitch-preserving audio processing. Note that functionality of the pacing logic 114 and/or buffer management logic 116 may be combined and/or integrated with one or more other logic of the RP system 110, such as decoding logic of the media engine, the RTP/RTCP logic, etc.

In some embodiments, particularly with sufficient processing resources, the pacing logic 114 in cooperation with the buffer management logic 116 may be configured to generate pitch-preserving audio in buffer expansion or contraction implementations. For instance, for incoming MPEG-2 encapsulated audio, the RP system 110 may extract transport packets from the RTP or the UDP stream, extract audio from the transport packets, decode the audio and process the decoded audio to derive pitch-preserving audio, encode the pitch-preserving audio, and generate a new audio stream to feed to the demux 304.

The RP system 110 is further configured with the display and output logic 330, as indicated above, which includes graphics and video processing pipelines, among other circuitry, as known in the art to process the decoded pictures and associated audio and provide for presentation (e.g., display) on, or associated with, display device 112. A communications port 332 (or ports) is further included in the RP system 110 for receiving information from and transmitting information to other devices. For instance, the communication port 332 may feature USB (Universal Serial Bus), Ethernet, IEEE-1394, serial, and/or parallel ports, etc. In addition, communications port 332 may be configured for home networks (e.g., HPNA/MoCA, etc.). The RP system 110 may also include an analog video input port for receiving analog video signals.

One having ordinary skill in the art should understand in the context of the present disclosure that the RP system 110 may include other components not shown, including a compression engine, memory, decryptors, samplers, digitizers (e.g., analog-to-digital converters), multiplexers, conditional access processor and/or application software, driver software, Internet browser, among others. Further, though the pacing logic 114 and buffer management logic 116 are illustrated as residing in memory 322, it should be understood that one or more of pacing logic 114 and buffer management logic 116 may be incorporated in the media engine 306 in some embodiments, or elsewhere, such as in the O/S 324, among other locations or in conjunction with other logic of the RP system 110. Similarly, in some embodiments, functionality for one or more of the components illustrated in, or described in association with, FIG. 3 may be combined with another component into a single integrated component or device.

Figure 4:
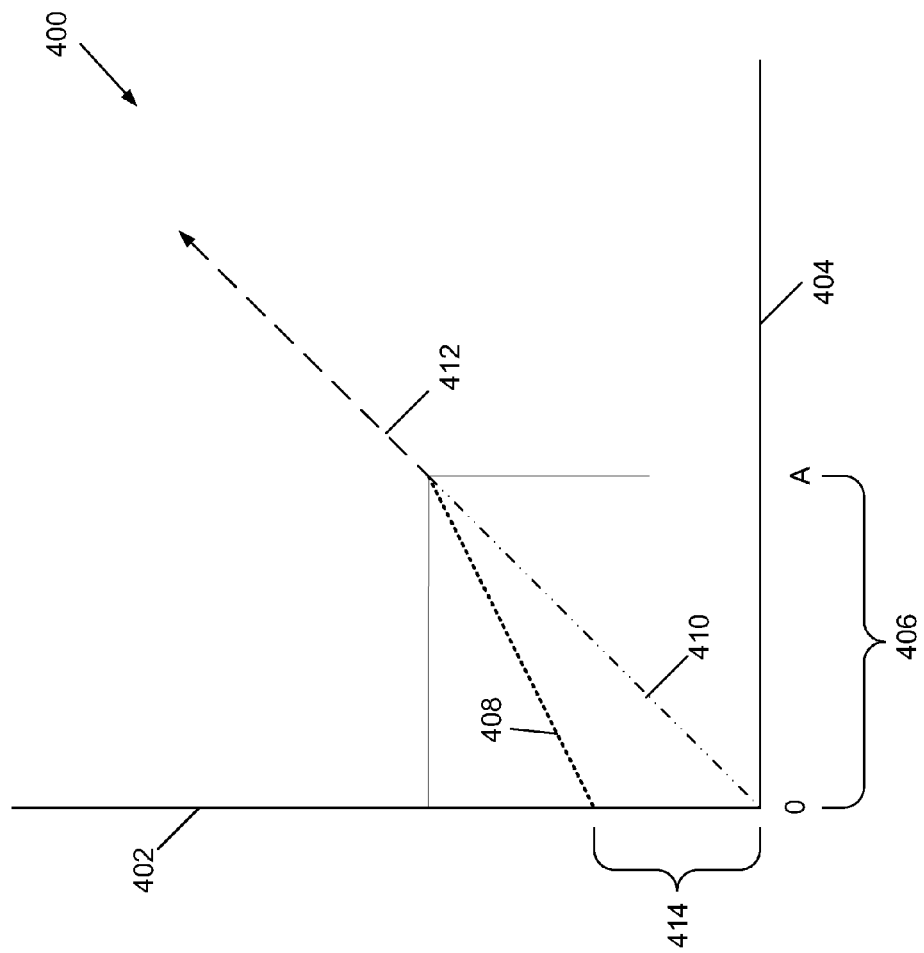
FIG. 4 is a schematic diagram that illustrates an example of A/V pacing responsive to a stream transition event in an example AVP system.

Having described various components of one or more embodiments of an AVP system, attention is directed to the schematic diagram 400 shown in FIG. 4, which illustrates one example embodiment of an AVP method in a fast channel change implementation. Shown is a timing diagram, not necessarily to-scale, with a vertical axis 402 corresponding to a stream time-base and a horizontal axis 404 corresponding to a decoder playout time base, the horizontal axis 404 comprising an interval of time 406. The interval 406 comprises an A/V presentation commencement time of zero (0), and an end of the interval represented beneath the horizontal axis 404 as "A," as further explained below. Shown during the interval 406 are two lines 408 (dotted) and 410 (interrupted dash). The dotted line 408 corresponds to pitch-preserving audio and video played-out at the same decoding rate (e.g., 0.8×, though other values may be used in some embodiments), which is a rate that is slower than the 1× rate of A/V programming received from an upstream network device, the latter represented by the interrupted dashed line 410. The dashed line 412 corresponds to the playout of A/V programming at the 1× rate, and commences at the end ("A") of the interval 406. Portion 414 corresponds to the initial audio-video time offset that is conventionally known.

At a time corresponding to commencement of a channel change (or other stream transition event), a linear A/V stream is received by the RP system 110 at, for instance, a 1× rate, as represented by interrupted dashed line 410. However, as noted by the portion 414, there exists, as conventionally known, a time-offset between audio and video of the received A/V stream (e.g., due to differences in buffering time between audio and video, FEC operations, etc.). This offset manifests itself to a viewer in the form of a lack of synchronization between what an actor in the video programming segment says and what his lips would appear to convey (i.e., lip synch issues). In one AVP system embodiment, the 1×A/V stream is not played out initially. Instead, 1× audio is replaced with the 0.8× pitch-preserving audio, and the video decoding rate is slowed (e.g., 0.8×). In other words, the playout initially (e.g., during the interval 406) comprises the slowed video and pitch-preserving audio (e.g., the latter received in the multiplex or via a separate stream) in synchronization with each other (e.g., same PTS values, no lip synch discrepancies), as shown by the dotted line 408. At a time corresponding to the end of the interval 406 ("A"), the pitch-preserving audio is substituted with (replaced by) the 1× audio, and the video decoding rate resumes at 1× for real-time playout, as shown by the dashed line 412. That is, the original 1× audio catches up (same PTS value) with the original 1× video at this point ("A"), and audio playout switches from the pitch-preserving audio to the original (1×) audio (and the video decoding rate is adjusted). Without the initial playout of the adjusted rate video and pitch-preserving audio, synchronized A/V presentation does not start earlier than point "A."

Figure 5:
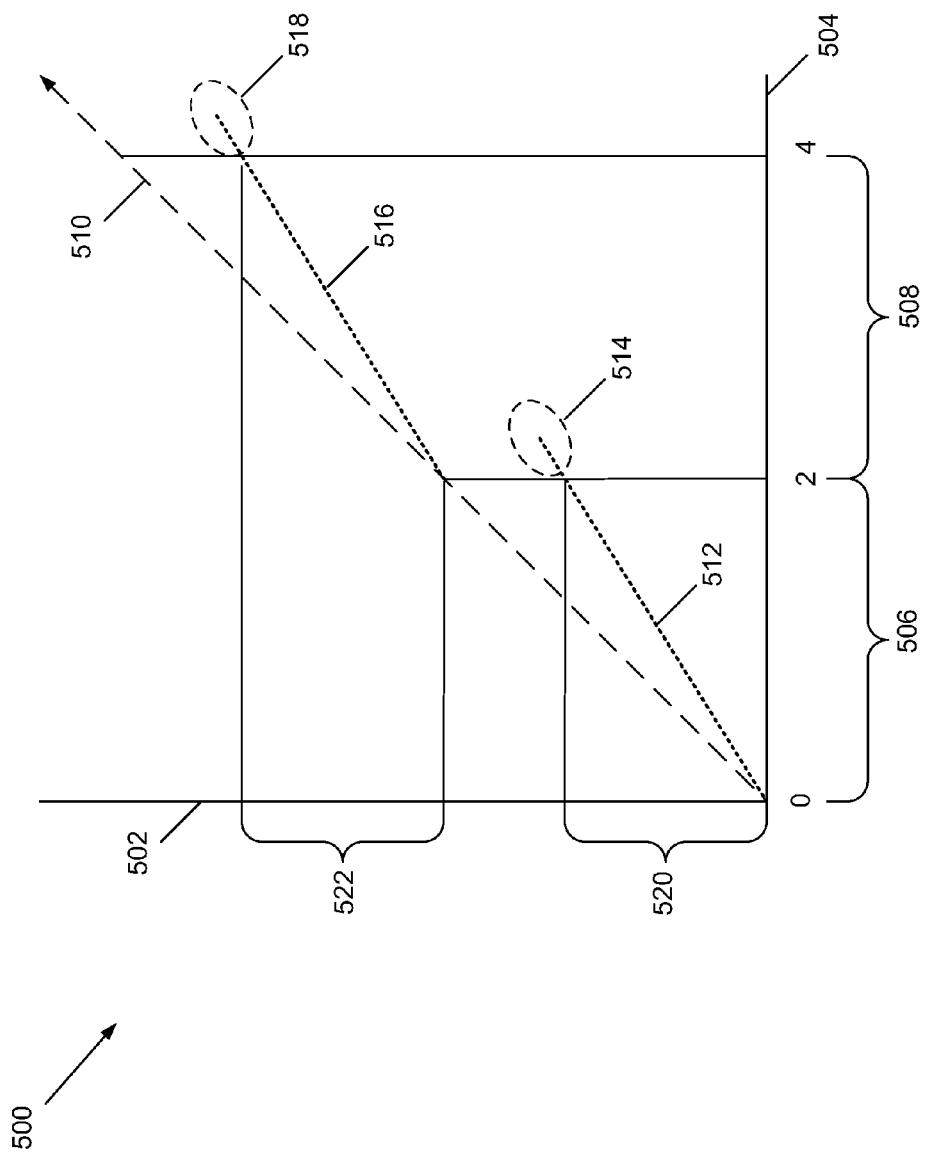
FIG. 5 is a schematic diagram that illustrates an example of buffer expansion in an example AVP system.

Attention is now directed to the schematic diagram 500 of FIG. 5, which illustrates one example embodiment of an AVP method in a buffer management (e.g., expansion) implementation. Note that similar principles apply for buffer contraction. As indicated above, buffer expansion or contraction may arise based on a given application environment. For instance, buffer expansion (a larger buffer) may be desired or needed in view of the delay inherent in the increased transfer times associated with retransmissions. Another example includes FEC block-re-adjustment. Certain embodiments of an AVP system may expand the buffer without halting presentation of the A/V programming (e.g., on-the-fly buffer expansion), and/or without negatively impacting (or mitigating negative impact) the viewer experience. In some embodiments, the AVP system may allow minor, yet mitigated suspension of playout. Shown is a vertical axis 502 corresponding to segmental reduced rate (e.g., 0.8×, though not limited to this value) time base, and a horizontal axis 504 corresponding to a headend playout time base (e.g., the time frame a viewer lives in). The headend playout time base 504 comprises two successive intervals 506 and 508 of equal length (e.g., 2 seconds per interval, though not limited to this value or equal length intervals). Though shown as two successive intervals, some embodiments may employ buffer expansion or contraction in a greater quantity of intervals, or skip one or more intervals during a defined period of time during which expansion or contraction is implemented. The dashed line 510 corresponds to 1× audio (e.g., real-time audio programming) over the span of at least the two successive intervals 506 and 508. It is noted that video is omitted from this diagram 500, though it should be understood that the AVP system reduces the video decoding rate contemporaneously with the pitch-preserving audio processing to effect an incremental video buffer size increase concomitantly with the audio buffer size increase. The dotted lines 512 and 516 correspond to the respective pitch-preserving audio that replaces the real-time audio at the start of each interval 506 and 508. That is, a pitch-preserving audio timestamp matches a real-time audio timestamp at least once for each applied interval 506 and 508. The overlap 514 and 518 of the pitch-preserving audio associated with each interval 512 and 516 corresponds to audio that is never played out. For example, in general, when slowing down (pacing-down) audio, practically speaking, it is an attempt to playout, say, 10 seconds of audio over 12 seconds. Using this 10 seconds/12 seconds example, the overlap corresponds to 2 seconds of pitch-preserving audio for a given segment never playing out. The overlaps 514 and 518 reflect this condition. Instead of playing-out the audio corresponding to the overlaps 514 and 518, audio playout commences with pitch-preserving audio corresponding for the next discrete interval (e.g., 508), timed to coincide with the real-time playout at commencement of the interval based on the RTP or transport level timestamp mechanisms. Also shown are time portions 520 and 522, which each correspond to, in this example, 1.6 seconds of audio played out over the 2 second interval. Note that, although 2 second intervals are shown for the horizontal axis 504, other values may be used.

With regard to one example method, the schematic diagram 500 reflects or illustrates an opportunity every two seconds to play out the audio at a slower rate. Stated differently, at the commencement of each interval 506 and 508, the real-time audio and video of the A/V programming match the reduced rate video and pitch-preserving audio, and the paced-down audio is maintained over the respective interval 506 and 508 to enable an incremental expansion of the buffer. A segment of pitch-preserving audio replaces the 1× audio at the start of interval 506 (in synchronization with a reduced rate video), and plays out at the 0.8× playout until the start of the next discrete interval 508. At commencement of the next interval 508, a segment of pitch-preserving audio replaces the 1× audio (and hence at this point, the 1× audio matches the 0.8× audio). As explained above, these segments of pitch-preserving audio and real-time audio can be matched at the start of each interval 506 and 508 based on PCR and timestamp information in the transport stream (e.g., adaptation field) or based on RTP timestamping mechanisms. This process of replacement at discrete intervals continues until the buffer management logic 116 determines that sufficient additional buffer space has been generated. Thus, the RP system 110 plays out audio using the pitch-preserving, 0.8× audio over each 2 second interval to dynamically increase the buffer size. In this example, the buffer size is incrementally increased by 400 milliseconds (ms) after each 2 second interval (2.0-1.6). As indicated above, the same applies to video, where video is played out at 0.8× speed over the same intervals. As indicated above, other values for playout rate may be used.

It is noted that, the buffer expansion (or contraction) may occur responsive to a stream changing event (e.g., automatically based on pre-configured settings of the RP system 110), or based on a feedback request as explained above.

With regard to contraction, a similar process is employed, except with an increase in rate (and receipt and processing of increased-rate, pitch-preserving audio samples).

It is noted that transitions from the pitch-preserving audio stream to the real-time (e.g., 1×) audio stream may be smoothed (e.g., made seamless) by the application of interpolation filters that are part of the pacing logic 114 or a separate module in the RP system 110.

The codec logic 212, pitch logic 214, encryption logic 216, pacing logic 114, buffer management logic 116, and media engine 306 may be implemented in hardware, software, firmware, or a combination thereof. To the extent certain embodiments of the codec logic 212, pitch logic 214, encryption logic 216, pacing logic 114, buffer management logic 116, and media engine 306 or a portion thereof are implemented in software or firmware, executable instructions for performing one or more tasks of the codec logic 212, pitch logic 214, encryption logic 216, pacing logic 114, buffer management logic 116, and media engine 306 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the codec logic 212, pitch logic 214, encryption logic 216, pacing logic 114, buffer management logic 116, and media engine 306 or a portion thereof are implemented in hardware, the codec logic 212, pitch logic 214, encryption logic 216, pacing logic 114, buffer management logic 116, and media engine 306 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 6:
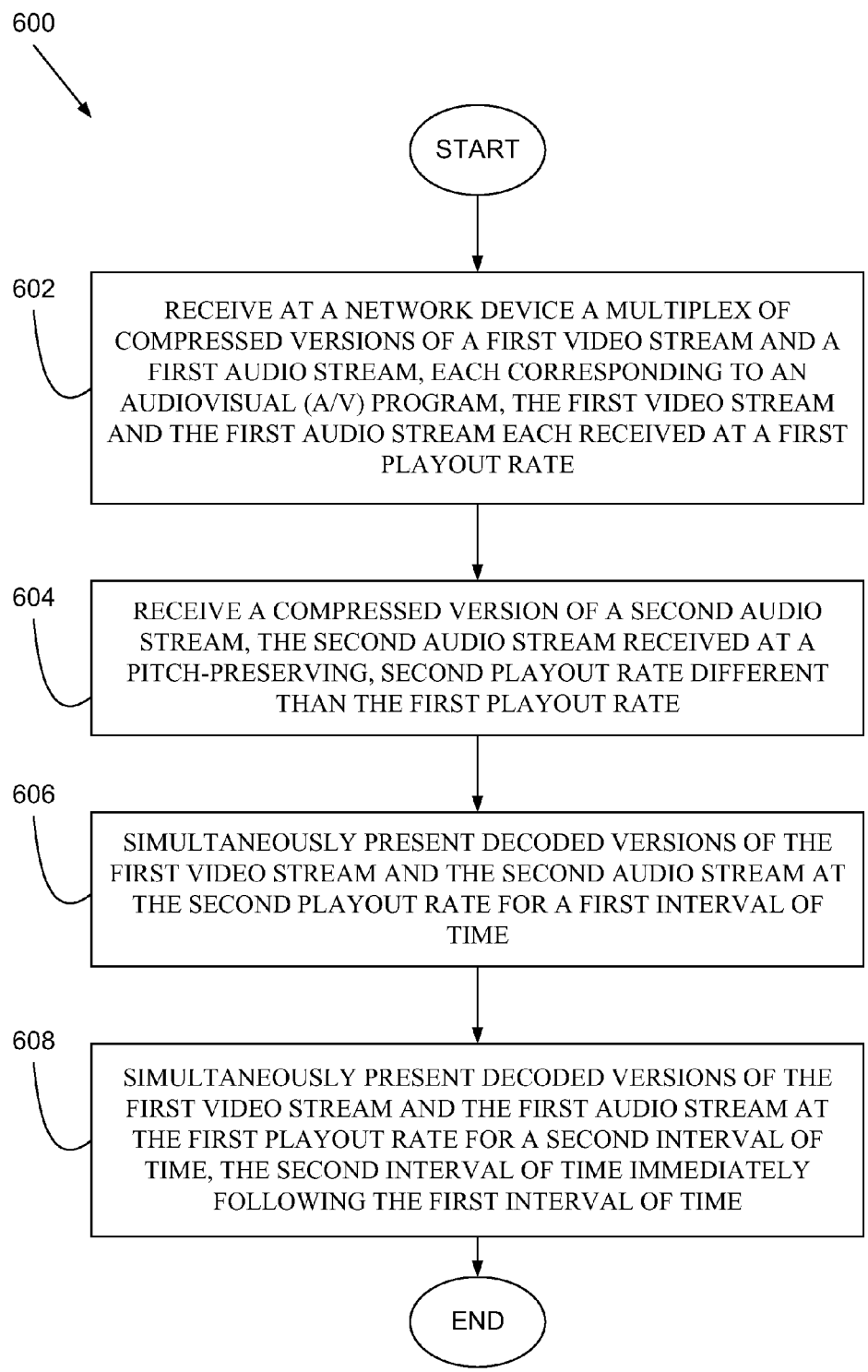
FIG. 6 is a flow diagram that illustrates an embodiment of an AVP method implemented at a downstream network device of an example AVP system.

Having described various embodiments of AVP system, it should be appreciated that one method embodiment 600, shown in FIG. 6, and implemented in one embodiment by logic (hardware, software, or a combination thereof) in a downstream network device of an AVP system comprises receiving at the network device a multiplex of compressed versions of a first video stream and a first audio stream, each corresponding to an audiovisual (A/V) program, the first video stream and the first audio stream each received at a first playout rate (602); receiving a compressed version of a second audio stream, the second audio stream received at a pitch-preserving, second playout rate different than the first playout rate (604); simultaneously presenting decoded versions of the first video stream and the second audio stream at the second playout rate for a first interval of time (606); and simultaneously presenting decoded versions of the first video stream and the first audio stream at the first playout rate for a second interval of time, the second interval of time immediately following the first interval of time (608).

Figure 7:
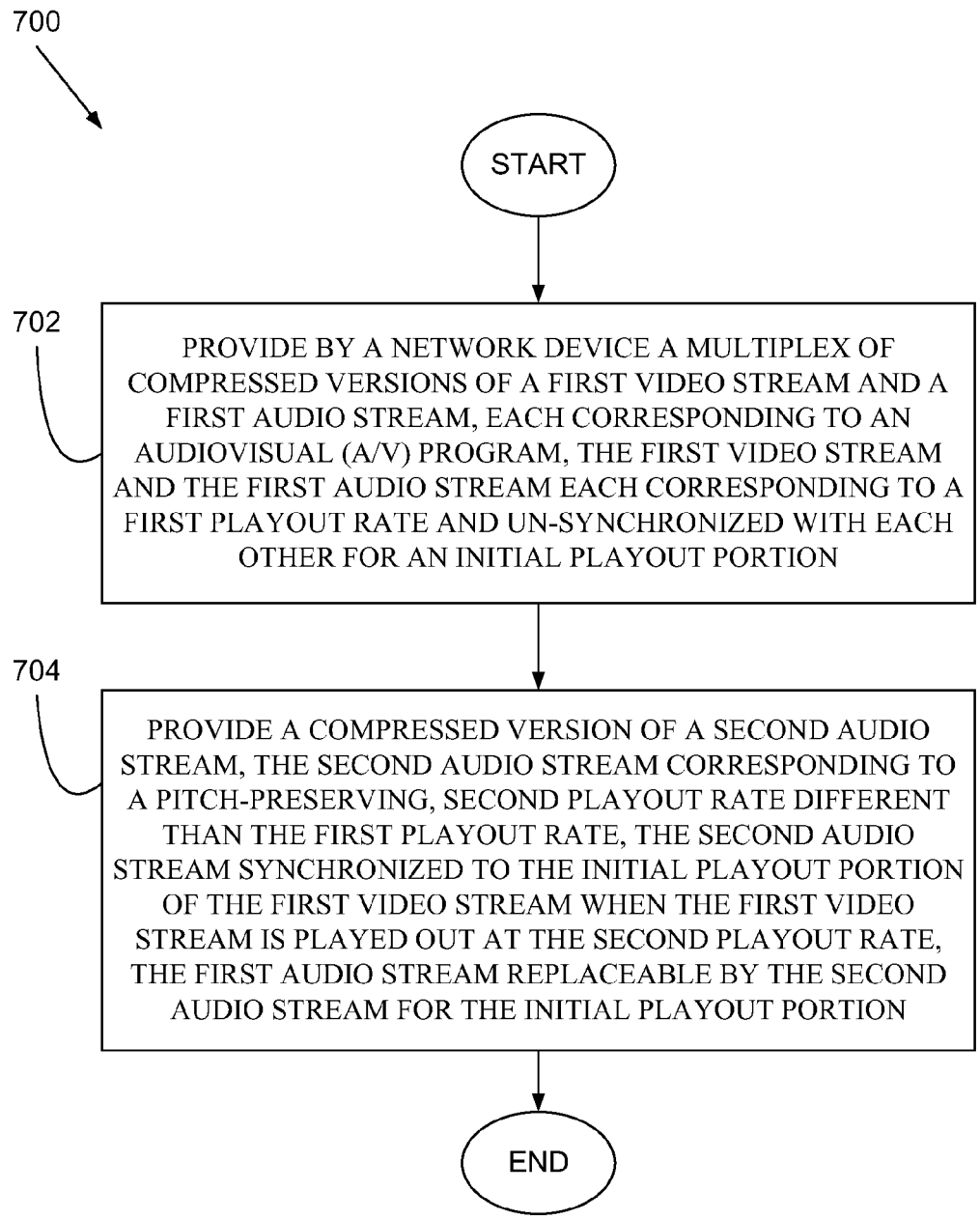
FIG. 7 is a flow diagram that illustrates an embodiment of an AVP method implemented at an upstream network device of an example AVP system.

Another method embodiment 700, shown in FIG. 7, and implemented in one embodiment by logic (hardware, software, or a combination thereof) of an upstream network device of an AVP system comprises providing by the network device a multiplex of compressed versions of a first video stream and a first audio stream, each corresponding to an audiovisual (A/V) program, the first video stream and the first audio stream each corresponding to a first playout rate and un-synchronized with each other for an initial playout portion (702); and providing a compressed version of a second audio stream, the second audio stream corresponding to a pitch-preserving, second playout rate different than the first playout rate, the second audio stream synchronized to the initial playout portion of the first video stream when the first video stream is played out at the second playout rate, the first audio stream replaceable by the second audio stream for the initial playout portion (704).

Figure 8:
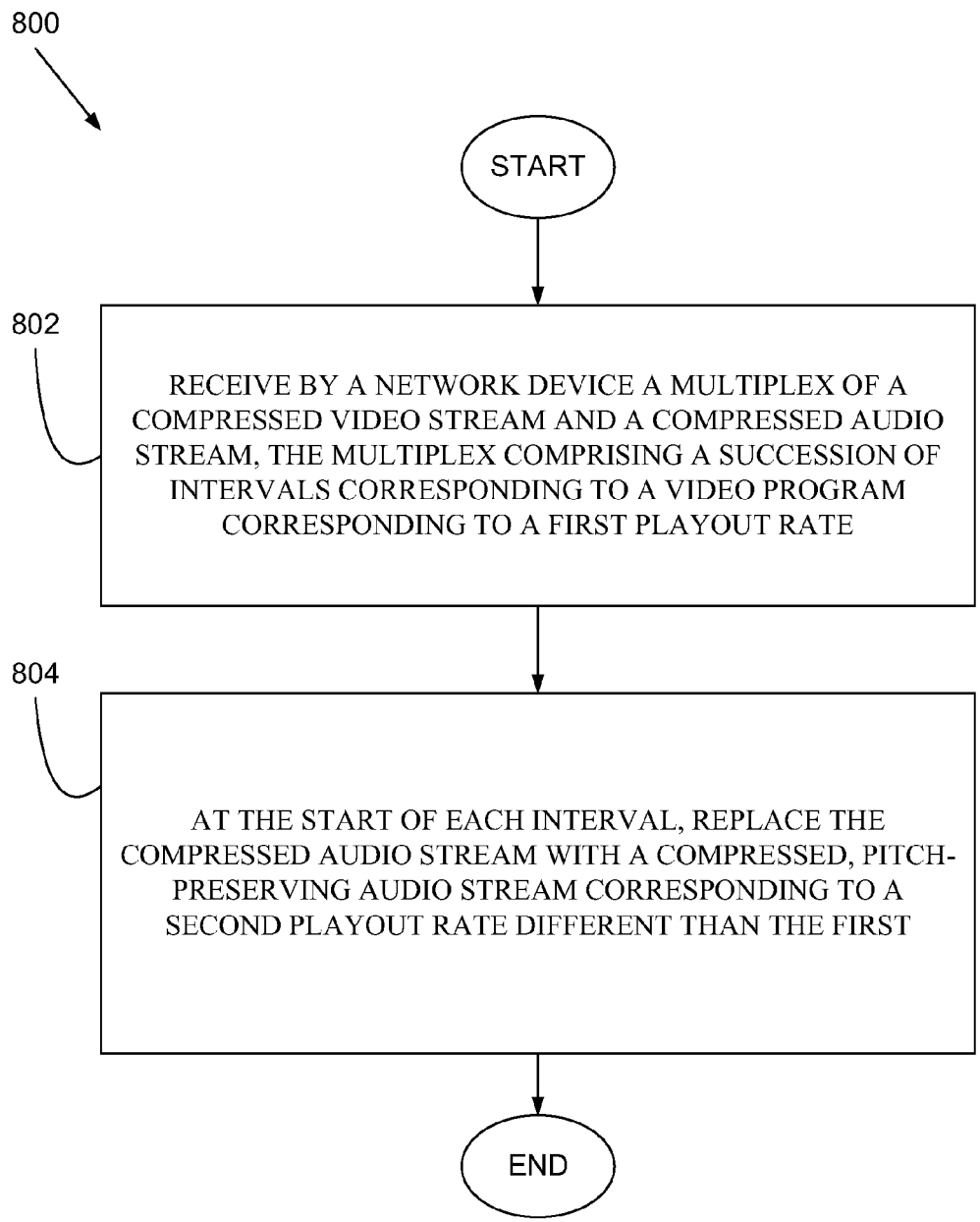
FIG. 8 is a flow diagram that illustrates an embodiment of a buffer expansion/contraction method implemented at a downstream network device of an example AVP system.

Another method embodiment 800, shown in FIG. 8, and implemented in one embodiment by logic (hardware, software, or a combination thereof) of a downstream network device of an AVP system comprises receiving by the network device a multiplex of a compressed video stream and a compressed audio stream, the multiplex comprising a succession of intervals corresponding to a video program corresponding to a first playout rate (802); and at the start of each interval, replacing the compressed audio stream with a compressed, pitch-preserving audio stream corresponding to a second playout rate different than the first (804).

Figure 9:
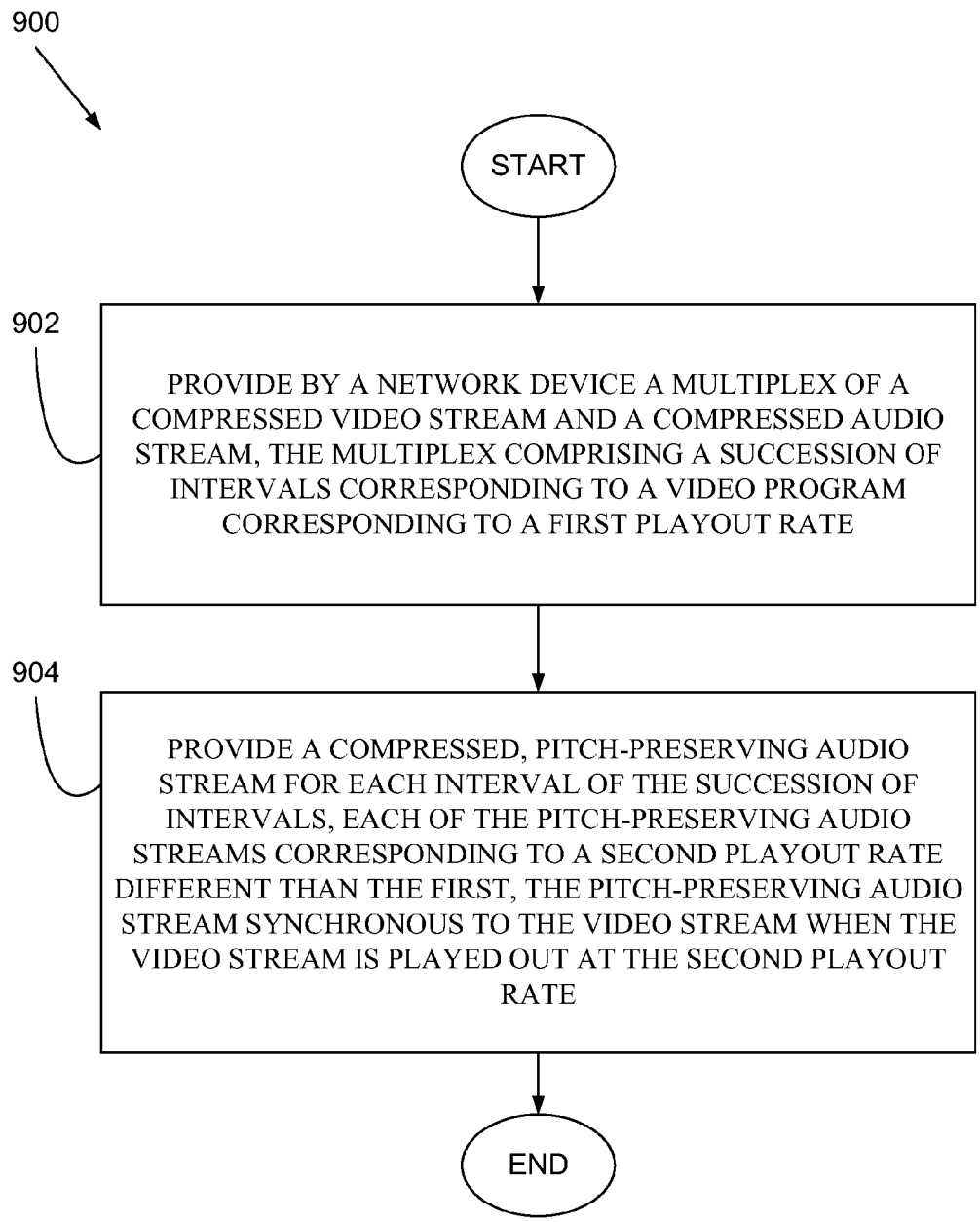
FIG. 9 is a flow diagram that illustrates an embodiment of a buffer expansion/contraction method implemented at an upstream network device of an example AVP system.

Another method embodiment 900, shown in FIG. 9, and implemented in one embodiment by logic (hardware, software, or a combination thereof) of an upstream network device of an AVP system comprises providing by the network device a multiplex of a compressed video stream and a compressed audio stream, the multiplex comprising a succession of intervals corresponding to a video program corresponding to a first playout rate (902); and providing a compressed, pitch-preserving audio stream for each interval of the succession of intervals, each of the pitch-preserving audio streams corresponding to a second playout rate different than the first, the pitch-preserving audio stream synchronous to the video stream when the video stream is played out at the second playout rate (904).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 6-9 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIGS. 6-9, either in the beginning, end, and/or as intervening steps.

It should be emphasized that the above-described embodiments of the present disclosure are merely possible examples of implementations, merely set forth for a clear understanding of the principles of the AVP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method implemented at a downstream network device, comprising:
   receiving at the network device a multiplex of compressed versions of a first video stream and a first audio stream, each corresponding to an audiovisual (A/V) program, the first video stream and the first audio stream each received at a first playout rate;
   receiving a compressed version of a second audio stream, the second audio stream received at a pitch-preserving, second playout rate different than the first playout rate;
   simultaneously presenting decoded versions of the first video stream and the second audio stream at the second playout rate for a first interval of time; and
   simultaneously presenting decoded versions of the first video stream and the first audio stream at the first playout rate for a second interval of time, the second interval of time immediately following the first interval of time.

2. The method of claim 1, wherein receiving the compressed version of the second audio stream and the compressed version of the first video stream comprises receiving a first presentation timestamp value corresponding to an audio frame and a second presentation time value corresponding to a video frame, respectively, the first presentation timestamp value equal to the second presentation timestamp value.

3. The method of claim 1, wherein the second interval of time commences immediately responsive to a presentation timestamp value corresponding to an audio frame of the first audio stream matching a presentation timestamp value corresponding to a video frame of the first video stream.

4. The method of claim 1, wherein simultaneously presenting further comprises audio and video decoding, and further comprising altering a video decoding clock rate at a time corresponding to commencement of the first time interval of time immediately responsive to receipt of a decodable reference frame with an associated timestamp in the first video stream, and altering the video decoding clock rate at a subsequent time corresponding to commencement of the second interval of time immediately responsive to a match between a presentation timestamp value of an audio frame corresponding to the first audio stream and a presentation timestamp value of a video frame corresponding to the first video stream.

5. The method of claim 1, wherein simultaneously presenting the decoded versions of the first video stream and the second audio stream at the second playout rate for the first interval of time further comprises abstaining from presenting a decoded version of the first audio stream.

6. The method of claim 1, wherein receiving the multiplex and the compressed version of the second audio stream commences directly responsive to an A/V stream event and without a time offset between audio and video frames corresponding to the A/V program.

7. The method of claim 1, further comprising receiving plural selectable compressed audio streams including the compressed version of the second audio stream, the plural selectable compressed audio streams each having a pitch-preserving playout rate different than the others, each capable of replacing the first audio stream depending on decoding logic requirements.

8. The method of claim 1, wherein receiving the compressed version of the second audio stream comprises receiving the compressed version of the second audio stream either in association with the multiplex or separate from the multiplex.

9. The method of claim 1, further comprising receiving information separate from the multiplex and switching between the first audio stream and the second audio stream based on the information.

10. The method of claim 1, further comprising receiving information associated with the multiple and switching between the first audio stream and the second audio stream based on the information.

11. The method of claim 1, wherein frames of the first video stream and first audio stream during the first interval of time are un-synchronized.

12. A method implemented at an upstream network device, comprising:
   providing by the network device a multiplex of compressed versions of a first video stream and a first audio stream, each corresponding to an audiovisual (A/V) program, the first video stream and the first audio stream each corresponding to a first playout rate and un-synchronized with each other for an initial playout portion; and providing a compressed version of a second audio stream, the second audio stream corresponding to a pitch-preserving, second playout rate different than the first playout rate, the second audio stream synchronized to the initial playout portion of the first video stream when the first video stream is played out at the second playout rate, the first audio stream replaceable by the second audio stream for the initial playout portion.

13. The method of claim 12, wherein the second audio stream and the first video stream comprise matched presentation timestamp values for the initial playout portion.

14. The method of claim 12, further comprising providing plural selectable compressed audio streams including the compressed version of the second audio stream, the plural selectable compressed audio streams each having a pitch-preserving playout rate different than the others, each capable of replacing the first audio stream depending on decoding logic requirements.

15. The method of claim 12, wherein providing the compressed version of the second audio stream comprises providing the compressed version of the second audio stream either in association with the multiplex or separate from the multiplex.

16. The method of claim 12, further comprising providing information separate from the multiplex, the information signaling the decoding logic to replace the first audio stream with the second audio stream for the initial playout portion.

17. The method of claim 12, further comprising providing information associated with the multiplex, wherein decoding logic replaces the first audio stream with the second audio stream based on the information.

18. The method of claim 12, wherein frames of the first video stream and frames of the first audio stream are un-synchronized during the initial playout portion.

19. A system, comprising:

an upstream network device comprising a processor and logic configured by the processor to:

provide a multiplex of compressed versions of a first video stream and a first audio stream, each corresponding to an audiovisual (A/V) program, the first video stream and the first audio stream each corresponding to a first playout rate and un-synchronized with each other for an initial playout portion; and provide a compressed version of a second audio stream, the second audio stream corresponding to a pitch-preserving, second playout rate different than the first playout rate, the second audio stream synchronized to an initial playout portion of the first video stream when the first video stream is played out at the second playout rate, the second audio stream configured to replace the first audio stream for the initial playout portion.

20. The system of claim 19, further comprising a downstream network device, the downstream network device comprising a processor and logic configured by the processor to:

receive the multiplex, the first video stream and the first audio stream each received at the first playout rate;

receive the compressed version of the second audio stream at the second playout rate;

simultaneously present decoded versions of the first video stream and the second audio stream at the second playout rate for a first interval of time; and simultaneously present decoded versions of the first video stream and the first audio stream at the first playout rate for a second interval of time, the second interval of time immediately following the first interval of time.

* * * * *